United States Patent [19]

Lucchi

[11] 4,370,652
[45] Jan. 25, 1983

[54] CONTROL SYSTEMS FOR RADAR RECEIVERS

[75] Inventor: George A. Lucchi, Granada Hills, Calif.

[73] Assignee: Sperry Corporation, New York, N.Y.

[21] Appl. No.: 165,937

[22] Filed: Jul. 2, 1980

[51] Int. Cl.³ .............................................. G01S 7/34
[52] U.S. Cl. .................................. 343/5 SM; 343/7 A
[58] Field of Search ............................ 343/5 SM, 7 A

[56] References Cited

U.S. PATENT DOCUMENTS 2,435,960  2/1948  Fyler ........................... 343/5 SM X
4,169,263  9/1979  Hooker, Jr. ..................... 343/5 SM

FOREIGN PATENT DOCUMENTS 771246  3/1957  United Kingdom ............ 343/5 SM

Primary Examiner—T. H. Tubbesing
Attorney, Agent, or Firm—Howard P. Terry

[57] ABSTRACT

An echo ranging weather radar system in which the bandwidth B of the radar receiver is made roughly equal to the bandwidth of the frequency spectrum of at least some expected weather echoes. In one embodiment, $B T_R$ is made equal to $\alpha$ during a time interval corresponding to a range increment at maximum range and during an earlier period corresponding to lower ranges, is varied inversely with range, where $T_R$ is the duration of an echo pulse which would be produced by a target of reference size, and $\alpha$ is a constant such as 1.2. In another embodiment, B is varied according to the duration T of actually received echo signals so as to set $BT \cong \alpha$ during each echo reception interval, for different values of T. The gain of the receiver also may be varied with time.

10 Claims, 11 Drawing Figures

CONTROL SYSTEMS FOR RADAR RECEIVERS

This invention relates to radar and more particularly to the control of radar receivers.

Improved performance of a radar system may be obtained by controlling various characteristics of its receiver. For example, the sensitivity or gain of the radar receiver may be adjusted in accordance with either the range to the target or the signal level of the returned radar pulses. The former is sometimes known as Sensitivity Time Control (STC), and the latter as Automatic Gain Control (AGC) but the terms are often used interchangeably.

In radar systems embodying the invention, improved performance of the system is obtained by adjusting the bandwidth B of the radar receiver. B is made variable and is adjusted to a value $B = \alpha/T$ for a time interval corresponding to a range increment at at least one radar range, where $\alpha$ is a constant and T is the duration of a radar return pulse which would be produced by a target of a certain size at that range. In one embodiment, the receiver bandwidth is adjusted in response to the durations $T_O \ldots T_N$ of different radar return pulses $P_O \ldots P_N$, to bandwidths $B_O = \alpha/T_O \ldots B_N = \alpha/T_N$, respectively, during the respective reception periods of the pulses $P_O \ldots P_N$. In another embodiment, the receiver bandwidth is adjusted to a value $B = \alpha/T_R$ during a time period corresponding to a range increment at approximately the maximum radar range, and is varied inversely with range during an earlier time period corresponding to smaller ranges, where $T_R$ is the duration of a radar return pulse which would be produced by a target of reference size (i.e., one having a diameter of three miles). The receiver gain also may be controlled, taking into account the change in effective gain resulting from bandwidth control, so that during one time interval the overall effective receiver gain varies as $1/R^2$, and during another later time interval as $1/R^4$, where R is range.

Figure 1A:
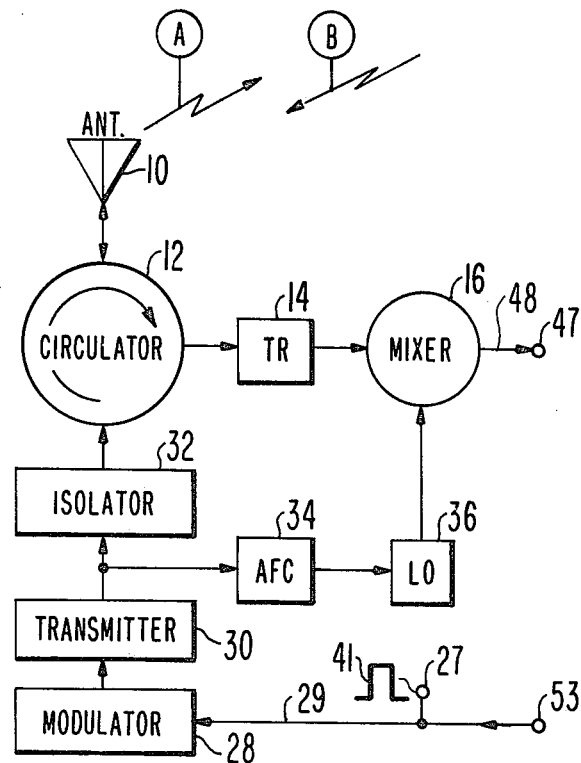
FIG. 1A is a block diagram of certain elements of a conventional pulsed radar system suitable for use in practicing the present invention.

FIG. 1A shows the main components of a portion of a typical weather radar system comprising an antenna 10 coupled through a circulator 12 to a transmit-receive (TR) device 14. TR device 14 is a conventional passive electronic switch which functions to protect the radar receiver from damage due to high power signals generated during transmission periods.

Encircled letters A, B, etc., located at various points in FIG. 1A as well as FIGS. 1B, 1C, 2 and 4, correspond to waveforms similarly identified in FIGS. 3, 5, 6 and 7. Some of the waveforms are not drawn to scale either as to amplitude (ordinate) or to time (abscissa). They are intended to be used as an aid in understanding principal steps in the operation of the circuits illustrated in various of the figures.

Figure 1B:
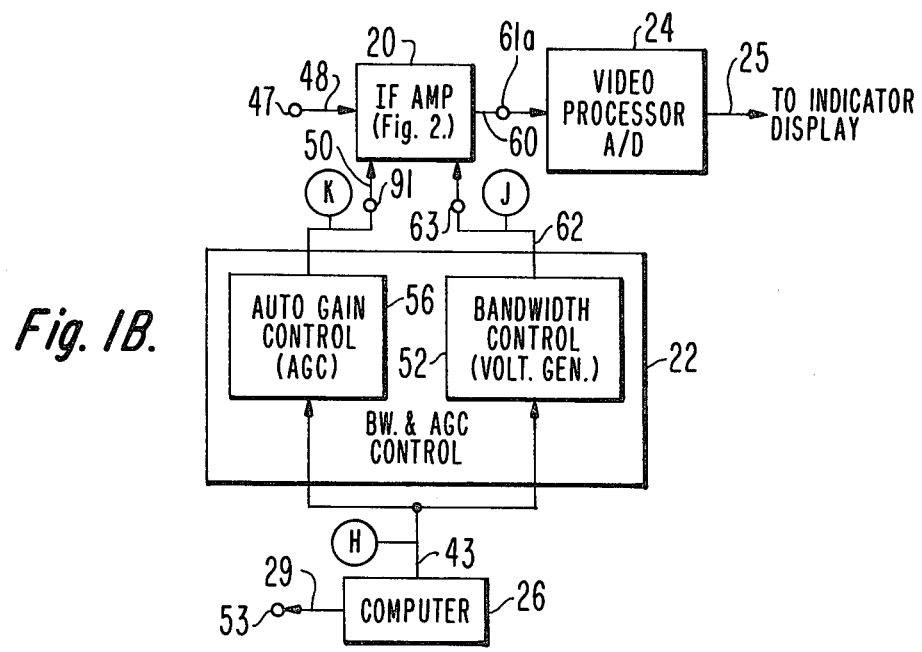
FIG. 1B is a block diagram of a system to be connected to the system of FIG. 1A, for practicing one aspect of the invention.
Figure 1C:
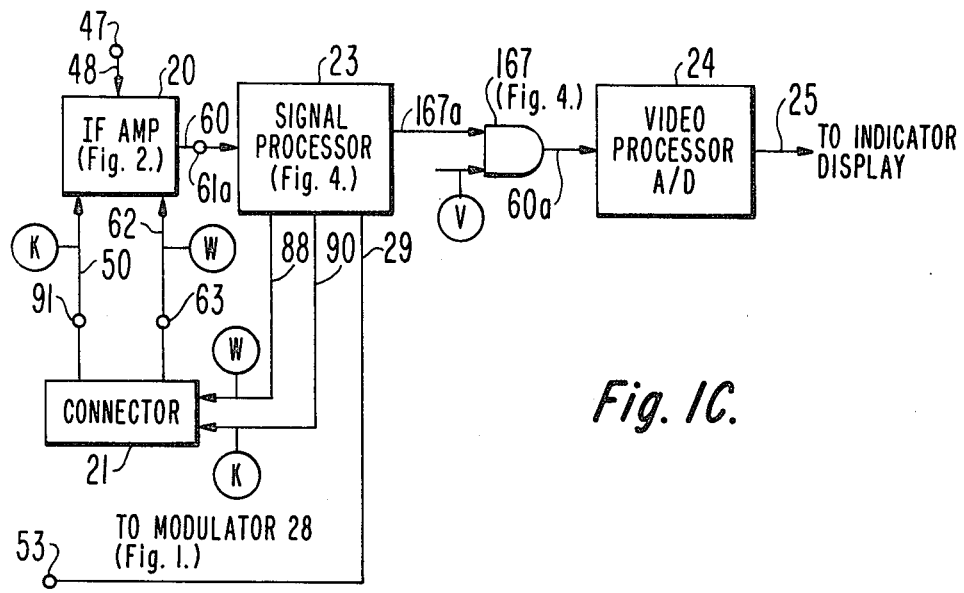
FIG. 1C is a block diagram of another system to be connected to the system of FIG. 1A illustrating another aspect of the invention.
Figure 2:
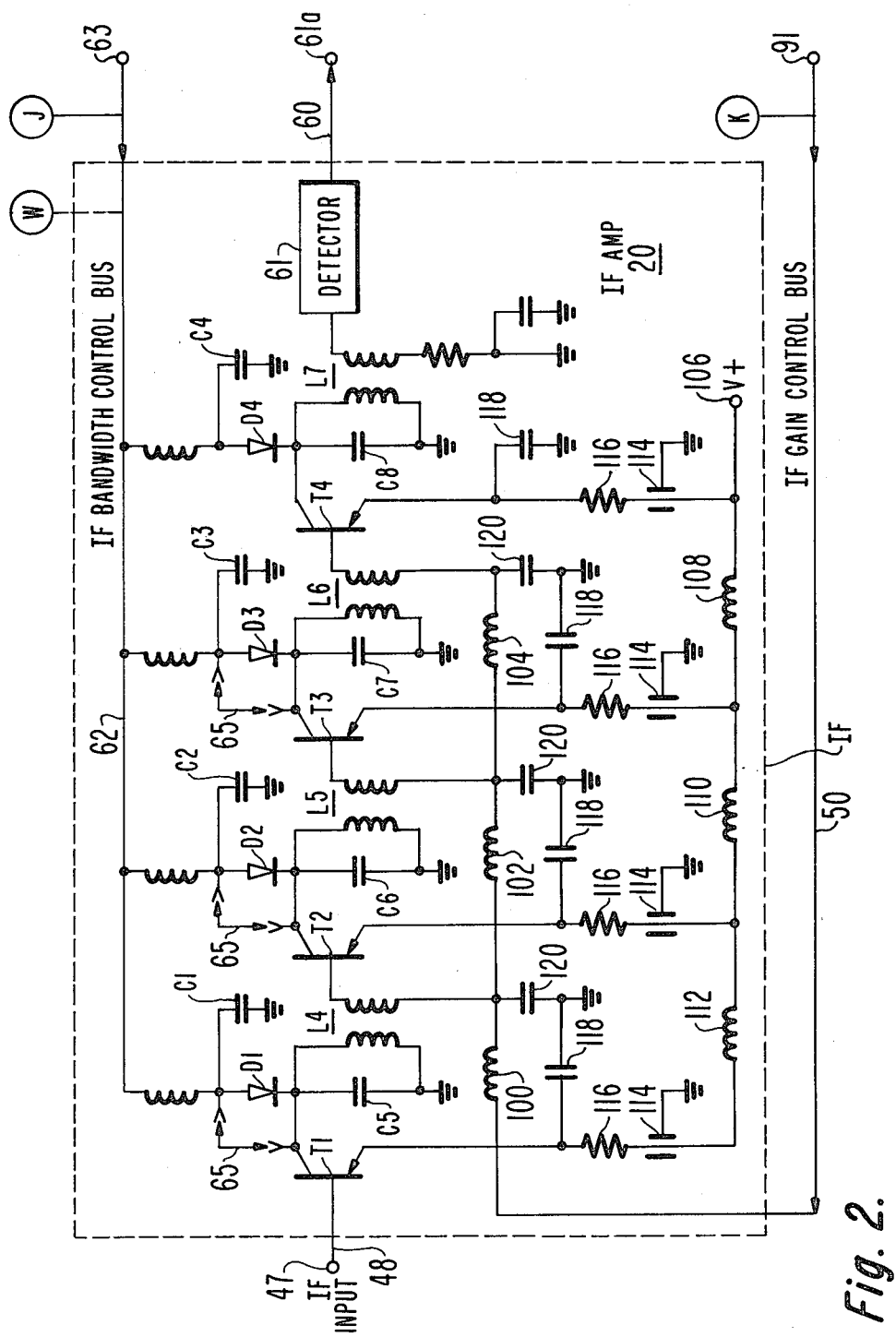
FIG. 2 is a schematic circuit diagram of an intermediate frequency (IF) amplifier with means for bandwidth and gain control.

The output of TR 14 is coupled to one input port of a mixer 16 whose output port is coupled to IF AMP input lead 48 and terminal 47 to components of either FIG. 1B or 1C, each of which figures includes IF (intermediate frequency) amplifier 20. One embodiment of an IF amplifier 20 is shown in FIG. 2 to be described.

A transmitter 30 having a pulsed carrier wave oscillator is effectively gated-on periodically by modulator 28 in response to control pulses 41 at a predetermined pulse repetition frequency (PRF) provided by computer 26 (FIG. 1B) or by a signal processor 23 (FIG. 1C). Pulsed output signals of transmitter 30 are coupled to isolator 32, through circulator 12 and then to antenna 10. The isolator prevents frequency pulling of the transmitter (which may be a magnetron) which could otherwise occur if the antenna became mismatched and also protects the transmitter from damage. Transmitter 30 is also coupled to AFC (automatic frequency control) unit 34. Isolator 32 is coupled to circulator 12. AFC unit 34 is coupled through local oscillator (LO) unit 36 to the second input port of mixer 16. Successive pulses A are transmitted as the antenna 10 is driven in azimuth by a motor (not shown). Return echoes B received by the antenna 10 are passed through circulator 12 to TR device 14 and mixed in mixer 16 with a signal from local oscillator 36 whose frequency is controlled by automatic frequency control circuit 34 synchronized to the frequency of transmitter 30. Signals from mixer 16 are passed from terminal 47 via lead 48 to IF amplifier 20 (FIG. 1B or 1C) and thence to a video processor (24) and display (not shown) via lead 25.

Terminal 53 of FIG. 1A is connected to the computer 26 shown in FIG. 1B or the processor 23 shown in FIG. 1C. The components of FIG. 1B are used to practice the aspect of the invention which provides for automatic gain and bandwidth control of the IF amplifier based on an assumed target of reference size at maximum range, as discussed in detail below. Computer 26 is a conventional digital computer used in the radar art suitably programmed to generate control signals used for many purposes including initiating a control signal 41 (FIG. 1A) for causing the transmitted pulse A to be radiated into space. The output of the IF amplifier 20 is applied via lead 60 to a conventional video processor 24. Video processor 24 responding to the detected output signals of IF amplifier 20 converts those signals to digital form for display in a suitable indicator. See U.S. Pat. No. 4,086,579 issued to F. C. Easter on Apr. 25, 1978 for a suitable indicator display. The operation of FIG. 1B will be discussed further after the description of FIGS. 1C and 2.

In a second form of the invention, the leads 47 and 53 of FIG. 1A are coupled to the components of FIG. 1C. IF amplifier 20 shown in FIG. 1C is identical to the amplifier shown in FIG. 1B and is illustrated in detail in FIG. 2 to be described. The output detected signals of IF amplifier 20 are coupled via path 60 to signal processor 23, shown in detail in FIG. 4 to be described. The output of signal processor 23 is coupled via lead 167a, gate 167 and lead 60a to a video processor 24 similar to that shown in FIG. 1B, embodied as an analog-to-digital converter, for generating a signal for display via path 25 as mentioned above in connection with FIG. 1B. A connector 21 provides feedback paths for leads 88 and 90, respectively, from processor 23 to IF amplifier 20 via leads 50 and 62. Signal processor 23 also provides a signal 41 (FIG. 1A) via path 29 for causing the transmit pulse 40 (waveform A, FIG. 5) to be initiated.

Before proceeding further, it is thought in order briefly to discuss a number of principles made use of in the present invention. An important aspect of the invention is to control the bandwidth of the radar receiver so that at least at one range interval of interest the bandwidth $B=\alpha/T$, where $\alpha$ is a constant equal to a particular value and T is the echo pulse duration. The effect on radar receiver performance of various values of B and T is discussed in MIT Radiation Lab Series Volume 24, (1950), pp. 199–201 and Radar Handbook by Skolnik, pp. 2–13 through 2–15. As is well understood, T is an indication of the bandwidth of the frequency spectrum of the pulse in that a Fourier analysis of a narrow pulse contains many higher frequency components (broad bandwidth) and that of a wide pulse fewer such components (narrow bandwidth). With $\alpha$ chosen to be a value such as 1.2, a certain parameter, variously defined as the "signal threshold power $P_{S90}$" in dB above noise in a bandwidth equal to $1/T$, and as the "visibility factor," is a minimum. For purposes of the present discussion, when $\alpha$ is at a constant value such as 1.2 or so, that is, when the "visibility factor" is a minimum or close to it, the receiver "sensitivity" to the echo signal can be considered to be at a desired optimal level. It is pointed out in the texts that when $\alpha$ is a value of roughly 1 or so, over a wide range of B and T, the visibility of a displayed target relative to the background noise is optimal. In the weather radar art, the value of 1.2 is considered to be an optimal value.

According to one aspect of the invention, the bandwidth of the receiver is adjusted so that for a target of reference size at the maximum range or close to the maximum range, the receiver bandwidth B is adjusted to a value such that $B=\alpha/T$, where $\alpha$ is equal to some desired value such as 1.2, and for smaller ranges the receiver bandwidth is made to vary inversely as a function of range. In applying this principle to weather radar, the reference target can be assumed to be one which is a sphere three miles in diameter caused by rainfall at some reference rate. The idea here is that many real targets will be somewhere close to this assumed value and if such a real target is at or close to the maximum range, it will produce radar return signals to which the radar receiver will be optimally sensitive as discussed above. For smaller targets at the maximum range, the receiver will be less sensitive. However, at shorter ranges, as the receiver bandwidth is increasing there will be a reasonable probability that the $BT=\alpha$ relationship will be satisfied for these smaller targets.

Moreover, with decreasing range for any particular target, large or small, the return signal amplitude will be higher than it would be at longer ranges and this can compensate for a less than optimal value of $\alpha$.

According to another aspect of the invention, the durations of echoes received during a search mode are employed for adjusting the receiver bandwidth to desired values during the reception of return pulses from these targets during the following ranging strobes in the same antenna azimuth sector.

In both of the modes described above, the gain of the receiver can be controlled as a function of range taking into account whether or not the target will be a so-called beam filling target. Assuming a target of reference size and knowing the cross-sectional area of the transmitted radar beam (the area measurement being made at a point 3 dB (half power point) down from the maximum value point at the beam center), it can be ascertained at what range the target completely fills the radar beam. As is well understood, up to this range the radar return signal level varies inversely as the square of the range and beyond this range, the radar return signal level varies inversely as the fourth power of the range. According to this aspect of the invention, the gain of the radar receiver is controlled as a function of range according to this change in expected signal strength.

Referring now to FIG. 2 there is shown a detailed schematic diagram of a preferred form of IF amplifier 20 which is used in both embodiments of the invention. Amplifier 20 comprises RF choke inductors 100, 102 and 104 connected through the secondary of transformers L4, L5 and L6, respectively, to the base of transistors T2, T3 and T4, respectively. Each of the four stages (defined by transistors T1–T4) of amplifier 20 is provided with a bias emitter voltage from d.c. source 106 via RF choke inductors 108, 110 and 112 coupled by a coaxial feedthrough capacitor having a grounded outer conductor 114. The d.c. voltage 106 (V+) is then coupled through dropping resistors 116 to the emitters of the respective transistors (T1–T4). a.c. bypass capacitors 118 are provided between the d.c. path and ground while d.c. blocking capacitors 120 are provided to isolate the gain control signal K (signal 46, FIG. 3) supplied from terminal 91 via lead 50, from the d.c. voltage +V.

Four parallel, identical resonant circuits (C5/L4, C6/L5, C7/L6 and C8/L7) are connected to bandwidth voltage control lead 62 through PIN diodes D1–D4, respectively. Each of the four resonant circuits are preferably tuned to the same center frequency. The PIN diodes are provided with RF bypass capacitors C1–C4, respectively, so that each PIN diode at RF is effectively in parallel with the resonant circuit to which it is connected. The resistance of PIN diodes (D1, D2, etc.) will change as a function of the voltage on lead 62 and thus change the bandwidth of each tuned circuit and thereby the bandwidth of the receiver as is explained below.

Q is the figure of merit of a tuned circuit. It is known that by increasing Q (reducing bandwidth) the "effective" gain of a receiver is increased in the sense that the false alarm rate decreases. Thus, for example, for a 2:1 reduction in receiver bandwidth, it is possible to increase the receiver gain by 3 dB to maintain the same false alarm rate. Q can be varied by varying the resistance placed across the parallel tuned circuit. The relationship between these parameters is:

$$Q = R_p/X_p \qquad (1)$$

where, as applied to any of the stages illustrated, i.e., the first one of FIG. 2, $X_p$ is the reactance of the tuned circuit, L4/C5, and $R_p$ is the equivalent resistance of the circuit in parallel therewith, in this case, the PIN diode D1 (as $C_1$ is an RF bypass capacitor, its resistance is zero or close to it). As the resistance $R_p$ of diode D1 is made smaller, the circuit Q of components C5/L4/D1 is reduced. As well understood in the art, as Q is decreased the receiver bandwidth B is increased. For example, a Q of 10 with a receiver center frequency of 30 MHz results in a 3 MHz, 3 dB bandwidth, while a Q of 100 for the same receiver results in a 3 dB bandwidth of 0.3 MHz. Thus, by controlling the voltage or current of PIN diodes D1–D4, the Q of each resonant circuit can be changed electronically; thereby the receiver bandwidth is accordingly changed. As already mentioned, the change in bandwidth affects the "effective" receiver gain in the sense that as bandwidth is decreased, the false alarm rate is decreased so that a signal of given amplitude is more readily detected and the effective receiver gain thereby increased (and vice-versa). The diodes (D1–D4) are arranged in the circuit to provide when each is biased to a relatively low resistance value in shunt across its associated tuned circuit, a low Q and thus a wide bandwidth. A narrow bandwidth is provided with a high Q when the resistance of the respective diodes is controlled to be relatively large. How the bandwidths (Q's) are varied will depend upon the mode of operation desired. In one embodiment, the control voltage (or current) on path 62 is arranged to bias the diodes such that the bandwidth of the tuned circuits is a maximum for short ranges and is gradually reduced at a predetermined rate, to be explained, to a minimum bandwidth (at which $BT=\alpha$ for a value of T corresponding to a reference 3 miles diameter target and a value of $\alpha$ such as 1.2) at the maximum range of the radar. In a second embodiment, the control voltage normally may be such that B is some minimum value but is changed to a new value $B_1$, $B_2$ and so on corresponding to the durations $T_1$, $T_2$ of target pulses during the times such pulses are received such that $B_1T_1=B_2T_2\ldots B_NT_N=\alpha$, where $\alpha$ is a value such as 1.2.

Detector 61, connected to the last stage (T4) by output transformer L7, provides an output video signal at terminal 61a on path 60, in response to an input IF signal on path 48 at terminal 47, for application directly to the following video processor 24 (FIG. 1B) and thence to the display, or via signal processor 23 (FIG. 1C) before the video processor 24.

The bandwidth control provided by controlling the diode bias at each of the four stages can be done at one stage if desired. For example, by simply not using the PIN diode in each stage in which bandwidth control is not wanted, as by the jumper path 65 across each of diodes D1, D2, D3, the bandwidth control is provided only in one stage, namely stage T4. One or more additional stages of bandwidth control is provided by removing the jumper 65 in the selected stages.

The IF amplifier in FIG. 2 can be arranged, if desired, to be tuned in a staggered manner for wider bandwidths at short ranges and in a synchronous manner for sharply tuned, narrow bandwidths at longer ranges. This is accomplished by providing individual bias control signals (not shown) for the respective diodes D1–D4. Each control signal can effect a different rate of change of the resistance of the diode resulting thereby in a different Q and bandwidth for each circuit. For short ranges a wide bandwidth receiver can be thus provided. For longer ranges the control signals of each diode will be identical so that the circuits are again synchronous with the same rate of change, as previously described, to provide a high Q, narrow bandwidth receiver for the longer ranges. Any suitable circuit for providing the individual bias control for the diodes may be provided to perform these functions and may be included as a portion of the voltage generator 52 (FIG. 1B).

Figure 3:
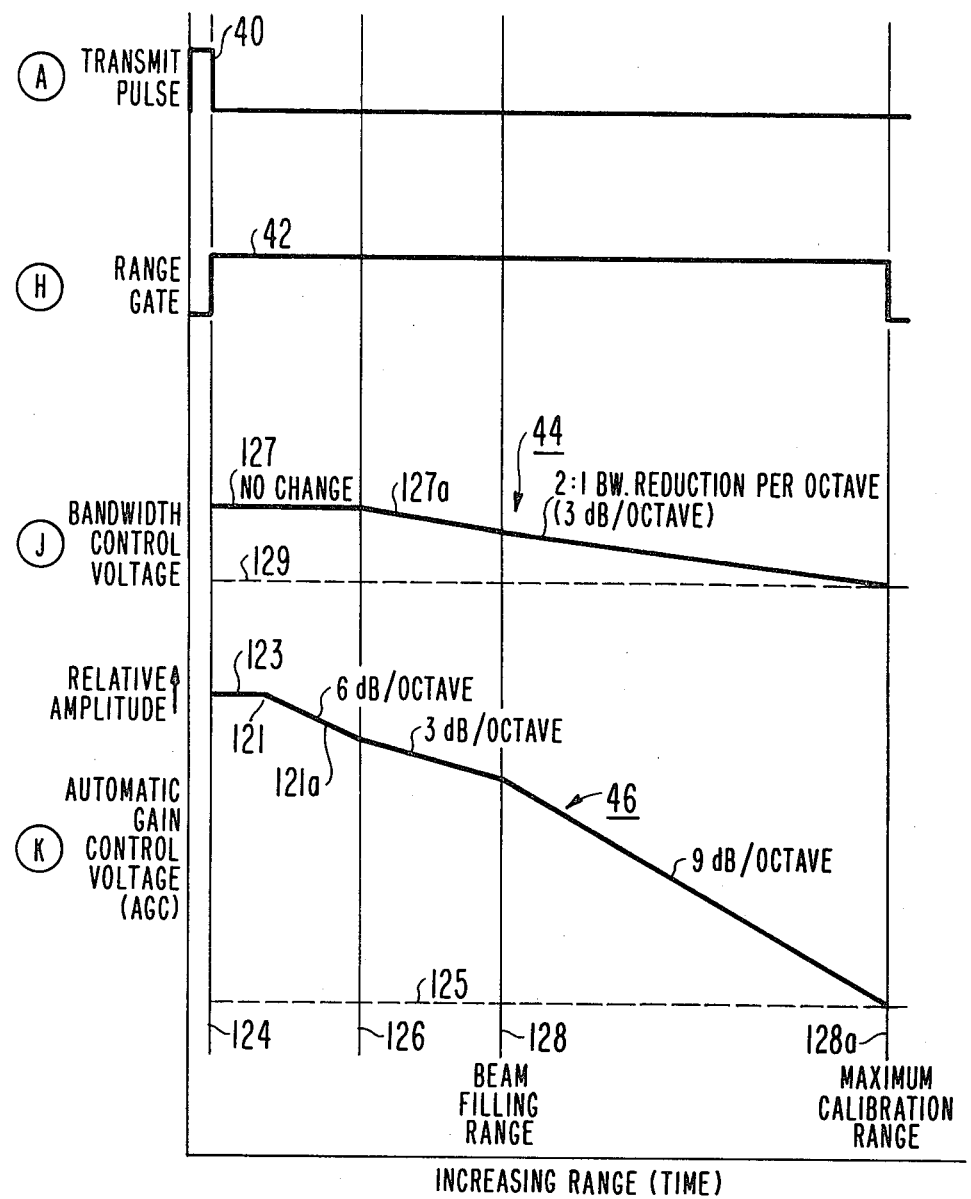
FIG. 3 illustrates signal and control waveforms which are referred to in the explanation of the operation of embodiments of the invention.

Reference is now made to FIGS. 1B and 3, particularly the bandwidth and AGC control 22 comprising AGC 56 and bandwidth control 52. Control 22 responds to a range gate signal 42 (waveform H, FIG. 3) on path 43 generated by computer 26 to provide both the AGC (waveform K) and bandwidth control (waveform J) voltages 46 and 44 to amplifier 20 via paths 50 (terminal 91) and 62 (terminal 63), respectively.

AGC 56 is a suitable voltage generator providing a continuous series of ramp voltages (46) that each vary with time, and thus range, at different rates.

A suitable implementation of the AGC voltage generator 56 takes the form of an R-C network in which the time constant can be selected to provide a linear region during the time the capacitor discharges. A network in which different voltage levels are used for supplying the R-C network will provide such a variable time constant circuit. The control voltage for such a network may be supplied by the computer 26 in a manner known in the art. Bandwidth control 52 is a similar voltage generator providing a ramp voltage (44) that also varies with time, and thus range, but at differing rates than the ramp rates of AGC voltage 46.

In order to keep fixed the sensitivity of the IF amplifier 20 (FIG. 2), such that a given weather target regardless of its range will be displayed at about the same intensity, the combined effect on the sensitivity of the receiver of each of the control voltages 44 and 46 is considered. First, with the waveform J shown, the bandwidth control voltage 44 serves to maintain the receiver bandwidth at a constant and maximum value (the Q is at a minimum value) for short ranges. Thus, no change of voltage 44 occurs along portion 127 from the starting time 124 (zero range) to an arbitrary time 126 corresponding to a predetermined short range of from say 5 to as many as 25 miles (depending upon the range scale and other factors). For this time period, voltage portion 127 keeps the receiver at a wide bandwidth $B_S$. If there is a relatively small target within this range which produces an echo of duration $T_S$ such that $B_ST_S=\alpha\cong 1.2$ or so, the receiver will have optimal sensitivity to this target. However, in this range, echoes are strong in any case and the wide bandwidth provides good signal resolution even if the target size is such that $\alpha$ differs considerably from the optimal value of 1.2.

At time 126, voltage 44 is arranged to cause the Q of the receiver to increase at a rate of 2:1 per octave of time (or range) to thereby reduce the overall receiver bandwidth at a corresponding rate. This is accomplished by the ramp portion 127a of waveform J (signal 44) which is not necessarily linear, although a good approximation of the control voltage variations required can be achieved with a linearly varying voltage. The bandwidth control voltage 44 serves to "match" the receiver bandwidth to the bandwidth of echoes of longer and longer duration as the range increases to satisfy the relation $BT=1.2$ discussed above.

At the maximum range which, by way of example, may be 200 or 300 nautical miles (NM), the value of voltage J is made to be such that the bandwidth "matches" the echo spectrum for a reference target of say 3 NM diameter, that is, for an echo of a duration $T_R = 3$ NM (12.35 $\mu$s/NM)$\cong 37$ $\mu$s, the bandwidth of the receiver will be $B_R = \alpha/T_R \cong 1.2/37 \times 10^{-6} \cong 30$ kHz. The reduction in receiver bandwidth (the increase in Q) results in an increase in the effective gain of the receiver for reasons already discussed. This enhancement of effective gain occurs independently of the gain variations of the receiver 20 produced by the AGC control voltage 46. This gain effect, due to the increase in Q, that is, the reduction of receiver noise power resulting from the reduced receiver bandwidth, contributes to the improved sensitivity of the receiver with increasing target range.

Next, consider the AGC voltage 46 (K, FIG. 3). This voltage serves to increase the gain of the IF amplifier 20 to compensate for the reduced strength of the echoes with increasing range. For echoes of targets that are in the beam filling range, the voltage 46 is reduced from a maximum value indicated by the level of portion 123 (corresponding to a predetermined minimum gain of the IF amplifier 20) to the short range 126 (5-25 miles), discussed earlier. There is no change in AGC voltage 46 during the portion 123 for very short ranges (0-5 miles) within which echoes are expected to be quite strong. Within the range interval between range 121 and range 126, if there is a target that fills the radar beam, its echo will be attenuated at the rate of $1/R^2$, corresponding to 6 dB per octave of range. As the bandwidth and Q of the receiver are constant during this interval (see waveform J), the receiver gain is increased at the rate of 6 dB per octave by the voltage 46 along ramp portion 121a to compensate for this loss in echo signal strength.

In the following range increment 126-128, a beam filling target produces echoes which are also attenuated as a function of $1/R^2$, that is, at a 6 dB/octave rate. However, the effective gain of the receiver obtained as a result of its bandwidth control in the same range increment, translates to an effective increase in gain, as a function of range, at a 3 dB/octave rate. This reduces the requirement of the AGC voltage 46 by a 3 dB per octave. Accordingly, the slope of the voltage 46 is made to be such in the range increment 126-128 as to increase the receiver gain by only 3 dB per octave. The overall effective gain of the receiver is thus made to 6 dB/octave, as desired, for this portion (126 to 128) of the range.

Beyond the beam filling range 128, that is, in the range increment 128-128a, the slope of the voltage waveform 46 is changed to a 9 dB/octave gain control rate to provide, when added to the 3 dB/octave effective gain contribution by the bandwidth change, a change in effective receiver gain of 12 dB/octave. This increase in effective gain, with range, compensates for the $1/R^4$ signal attenuation suffered by echoes from the non-beam filling targets assumed to be present in the 128-128a range increment.

Dashed line 125 represents the lowest voltage amplitude of the ramp voltage 46 for the maximum calibrated range for providing the maximum receiver gain at range 128a. Thus, voltage 46, when applied to IF amplifier 20 at terminal 91 (FIG. 2), will continue to increase the IF gain as it reduces to the minimum value at voltage amplitude 125. Similarly, line 129 represents the lowest amplitude of voltage 44 for providing minimum bandwidth.

It should be understood that for short ranges it is desirable to have the widest bandwidth to get high resolution, resulting in, however, relatively lower sensitivity. Thus, changing the bandwidth by voltage 44 would not be useful at short ranges. That is, the bandwidth is maintained at its maximum value to thereby be responsive to the narrowest echoes, i.e., those echoes having the widest frequency spectrum. However, as the range increases, by reducing the IF receiver bandwidth by voltage 44, increased sensitivity is achieved, but with a loss in resolution. At longer ranges the resolution of the radar signal is of no consequence since as a practical matter the scale on the display is large with poor resolution. Typically, a radar display uses 3 inches for 300 miles for long range modes of operation, while the same 3 inches of display is used for 30 miles for short range modes of operation. The manner in which the radar is changed from one range scale to another is conventional and is not part of the present invention.

The operation of the system illustrated in FIGS. 1A, 1B and 2 will now be described, referring also to the waveforms of FIG. 3.

Following each transmission signal 40 (waveform A), AGC unit 56 and voltage generator 52, responsive to range gate signal 42 (H, FIG. 3) over path 43 from computer 26, produce gain control signal 46 (K) appearing at output 91 and bandwidth control signal 44 (J) appearing at terminal 63, respectively, of amplifier 20. Computer 26, of known form, is programmed to provide transmit control signal 41 (FIG. 1A) and range gate signal 42 (FIG. 3) as well as the control voltages 44 and 46. AGC 56 controls the gain of IF amplifier 20 as a function of time or equivalent range. The function, as explained above, of AGC 56 is to increase the sensitivity of the radar receiver by increasing its gain with increasing range according to gain control signal 46. BW control 52 also controls the sensitivity of the radar receiver 20 by controlling its bandwidth by changing the resistance of PIN diodes D1, D2, etc., thereby changing the Q of the respective tuned circuits C4/L5, etc., as explained hereinabove.

The sensitivity of the receiver is changed generally as a function of range of the expected echoes (see, for example, the expected echo waveforms, F, FIG. 5, to be described later). In addition, the beam filling capabilities of a target of reference size is taken into account in that the respective slopes and amplitudes of the signals 44 and 46 are designed, in combination, to control the receiver effective gain, to be optimal both within and outside of the beam filling range, for this reference target. As discussed above, a radar receiver embodying the invention of FIG. 1B maintains the receiver output signal for the same type target of relatively uniform intensity not only for a range where beam filling reference target echoes attenuate, in amplitude, at the desired 6 dB per range octave rate (i.e., the $1/R^2$-rate) but also for ranges beyond that of the beam filling targets, where the echo strength reduces at a 12 dB per range octave rate (i.e., the $1/R^4$-rate). The concept of utilizing the two signals, namely the bandwidth control signal 44 and the gain control signal 46 to control receiver sensitivity according to the present invention, is not limited to a transmitted pulse 40 of fixed duration or fixed peak power.

Because it is not practical to vary the receiver bandwidth by many orders of magnitude (10:1 being a good limiting magnitude number), the receiver bandwidth reduction control to improve sensitivity should start later in the range probe following "main bang" 40. A review of FIG. 3 will help in understanding this procedure. For example, with a 1 MHz bandwidth, one may choose to start reducing the receiver bandwidth at a 3 dB/octave rate at a 25 mile range, range 126. At 50 miles the bandwidth is adjusted to 500 kHz. The next octave is 100 miles resulting in a 250 kHz bandwidth receiver. Then, at 200 miles it would be 125 kHz. For another example, if one starts the receiver gain increase at a range (121) of 6.25 miles, by 12.5 miles the gain would have to be increased by 6 dB; from 12.5 miles to 25 miles, another octave or 6 dB more; from 25 to 50 miles the increase would be at a 3 dB/octave rate because the receiver bandwidth made up from the other 3 dB loss. From 50 to 100 miles, a 9 dB per octave rate would be used to account for a total of 12 dB/octave since the probe signal 40 would now be beyond beam filling range (58 miles being the assumed beam filling range). The 9 dB/octave for the gain and effective gain of 3 dB for the receiver bandwidth would be continued until the dynamic gain and/or receiver bandwidth control reaches its design limit. These effects are tabulated as follows:

|  | GAIN CONTROL | BW CONTROL | EFFECTIVE GAIN BY ΔBW |
| --- | --- | --- | --- |
| 6.25–12.5 miles | +6 dB | 1 MHz | (not used) |
| 12.5–25 miles | +6 dB | 1 MHz | (not used) |
| 25.0–50.0 miles | +3 dB | 500 kHz | +3 dB |
| 50–100 miles | +9 dB | 250 kHz | +3 dB |
| 100–200 miles | +9 dB | 125 kHz | +3 dB |
| 200–400 miles | +9 dB | 62.5 kHz | +3 dB |
|  | +42 dB |  | +12 dB |

The total gain for gain control (signal 46) and effective gain by changing bandwidth (signal 44) is 54 dB (42 dB + 12 dB). It is assumed that at the range of 400 miles, (range 128a, FIG. 3, for example) in this illustrative example, the receiver gain is maximum with minimum receiver bandwidth.

The receiver target echoes that have durations T such that $BT = \alpha$, where $\alpha = 1.2$ or close to it, and B is the receiver bandwidth at the target range, will be displayed in an optimal way, as already discussed. Of course, some echoes will have durations such that $\alpha$ is different from the optimal value, However, many such echoes still will be displayed in reasonable fashion on the radar screen. It may be observed from the Radiation Labs reference (page 201) identified above that the BT v. $P_{S90}$ curves, while having minima at about 1.2, have a relatively large, relatively gently sloping region surrounding 1.2 and in the photographs on page 203, many echoes still are visible over a range of different values of BT. At very long ranges, small targets (which result in values of $\alpha$ much smaller than 1) are not detectable in any case unless very high powered radar systems with large antennas are used.

Figure 4:
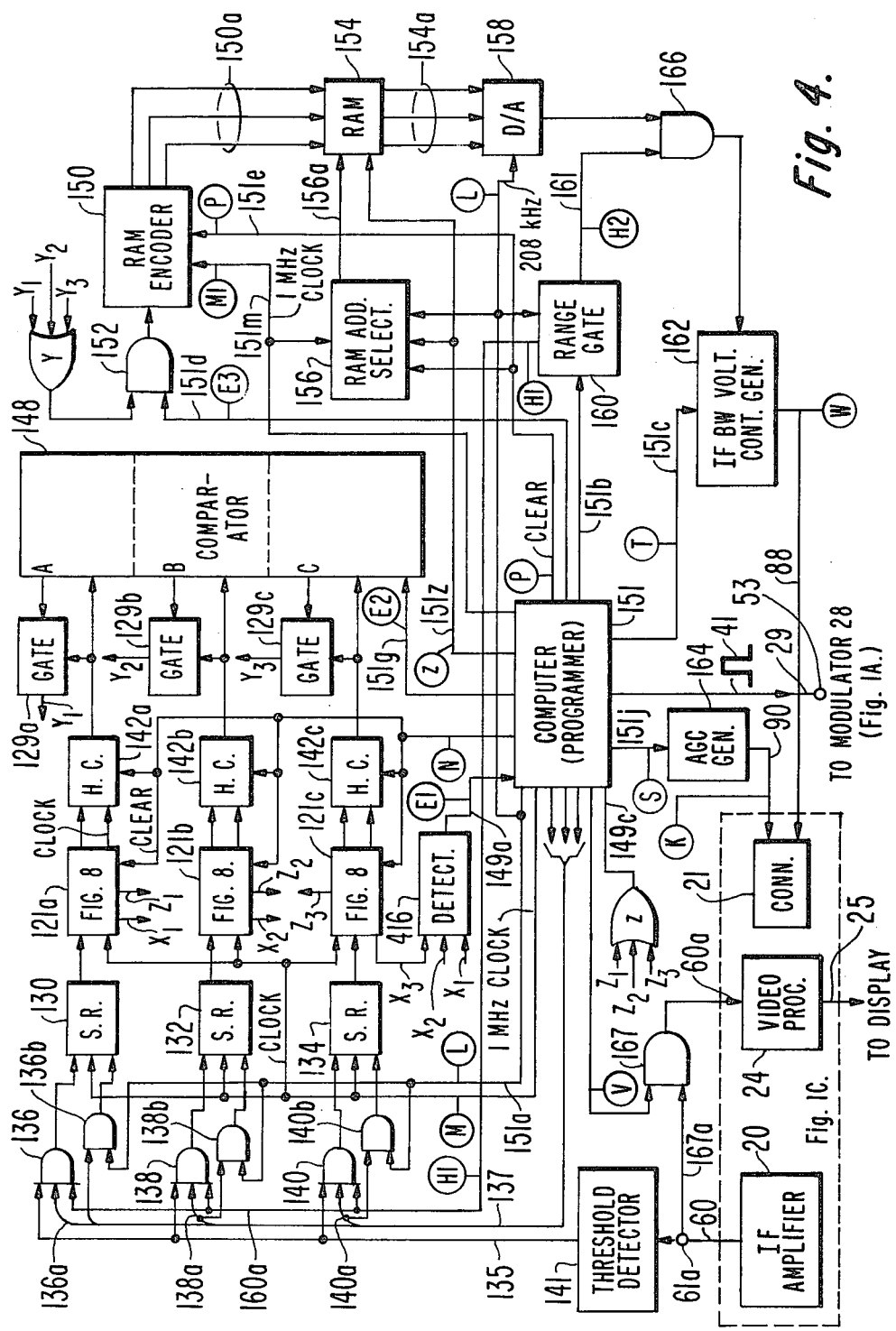
FIG. 4 is a block diagram of a signal processor of a system embodying a form of the invention having adaptive bandwidth control.

In the second embodiment of the invention illustrated in FIGS. 1C and 4, during a search mode the durations $T_1 \ldots T_N$ of echoes from targets are measured, and the results are stored. During a following operate mode, the receiver bandwidth B is controlled during each echo pulse interval to satisfy the relationship $B_1 T_1 = B_2 T_2 = \ldots B_N T_N = \alpha$, where $\alpha$ is a constant equal to a desired value such as 1.2. In one form of such system, gain of the receiver can be independently, automatically controlled in a manner somewhat similar to that described above in connection with AGC 56 (waveform K). However, in a simple version of the system illustrated herein, the receiver gain is increased at a 6 dB/octave rate within the beam filling range for a target of reference size (the 3 mile target previously discussed) and at a 12 dB/octave rate for longer ranges. In this form of the system the change in effective gain introduced into the receiver by changing the bandwidth is simply ignored.

In a more sophisticated form of the system, advantage can be taken of the measurement made of the echo duration. As will be explained in more detail below in the discussion of FIG. 4, in the system of FIG. 1C, the receiver bandwidth is controlled to be one of eight possible different values, depending upon the target size. For maximum target size, the receiver bandwidth is minimum and vice versa. Each of these eight differen bandwidth values introduces a different value of effective receiver gain. These different effective gain values can be compensated for in the system. The gain curve can include a regular component in which the gain increases at a 6 dB/octave rate for ranges up to beam filling range (for a three mile target—the target of reference size) and at a 12 dB/octave rate for longer ranges. Superimposed on this curve can be curved segments (concurrent with the echo reception periods) which introduce gain corrections to compensate for the change in effective gain introduced into the receiver during the echo reception period due to the change in receiver bandwidth.

FIG. 4 is a block diagram of a preferred form of the processor 23 to which reference is now made. The various signals shown in FIG. 4 represented by letters within a circle, L, M, N, etc., are also shown as waveforms in FIGS. 3, 5, 6 and 7.

Static-type shift registers 130, 132 and 134, each with a capacity of 256 bits (each bit corresponding to a different target range, called a range bin) are connected to the output of the echo signal receiver, viz., IF amplifier 20, through threshold detector 141 and a respective one input of associated AND gates 136, 138 and 140. Detector 141 has a predetermined threshold such that echo signals of greater than a given amplitude pass and signals of amplitudes less than the threshold value do not pass, serving thereby to minimize the processing of unwanted signals (false alarms) and noise. The AND gates are strobed through their respective second inputs via lead 160a carrying search range gate signal 179 generated by range gate 160. Search gate signal 179 (waveform H1, FIG. 6) is generated during the search or acquisition mode in synchronization with transmitter control pulse 41 provided by computer 151 to modulator 28 (FIG. 1A) via lead 29 to generate transmit pulse 40 (FIG. 1A) in a similar manner as done by computer 26 (FIG. 1B). Range gate circuit 160 provides both the range gate control signal 179 for the search mode (waveform H1, FIG. 6) and the data range gate signal 180 for the data acquisition mode (waveform H2, FIG. 7) started, respectively, in response to a control signal on path 151b synchronized to the transmit control pulse 41 from computer 151.

The duration of the gate signals (179, 180) is determined by the position of the operator's range selector switch (not shown) suitably coupled to the range gate 160 to adjust the duration of the respective gate signals (H1 and H2) to the selected range. The search gate signal 179 (H1) may be started by a signal on path 151b of one voltage level and data gate signal 180 (H2) by a voltage of a different level. Gate signal 179 (H1) is used for each of the three search mode transmit pulses 40 (FIG. 6) while gate signal 180 (H2) is used for five data collecting mode transmit signals 40 (FIG. 7), to be described. Computer 151 provides timing (clocks L, M, M1) and control signals on the circuit paths indicated by the encircled letters representing such timing and control signals, shown also in FIGS. 3, 5, 6 and 7.

The three shift registers 130, 132, 134 are employed to store bits during three successive search or acquisition scans during which the radar receiver is tuned to three different bandwidths, respectively. In the first such scan following one transmitted radar pulse, the receiver bandwidth may be 32.4 kHz and during this period AND gates 136 and 136b will be enabled and AND gates 138, 138b, 140 and 140b disabled so that only register 130 will store signals. In the next such scan following a second transmitted radar pulse, the receiver bandwidth is increased to say 100 kHz and during this period AND gates 138 and 138b will be enabled and AND gates 136, 136b, 140 and 140b disabled so that only register 132 will store signals. During the third search scan, following the third transmitted radar pulse 25 during which the receiver bandwidth is say 350 kHz, only AND gates 140 and 140b will be enabled, AND gates 136, 136b, 138 and 138b being disabled so that only register 134 will store signals.

Figure 8:
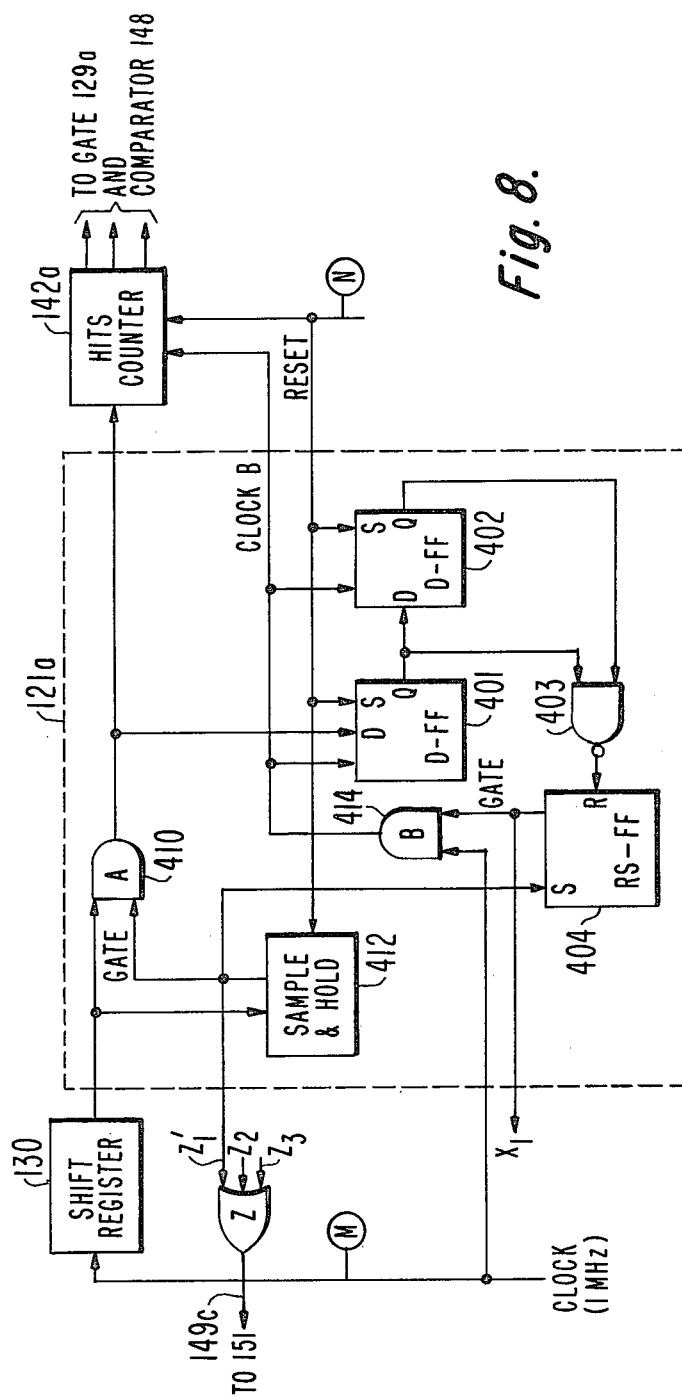
FIG. 8 is a diagram of certain components of FIG. 4.

The three shift registers 130, 132 and 134 supply their outputs to three circuits 121a, 121b and 121c, respectively, shown in FIG. 8, which contain essentially identical components. Accordingly, only the components within the dashed block 121a of FIG. 8 will be discussed. They include an AND gate 410 and sample-and-hold circuit 412. The shift register 130 supplies its output to both the gate 410 and the sample-and-hold circuit 412 and the latter supplies its output to the second input to AND gate 410 and to the reset-set flip-flop 404. AND gate 410 supplies its output to the D input terminal of D-type flip-flop 401 and to hits counter 142a. The flip-flop 401 supplies its output to the D input terminal to the second flip-flop 402. The two outputs of these two flip-flops are connected to a NOR gate 403 which produces a 1 output when two 0's are present in the D-type flip-flops and which produces a 0 output at other times. The output of the NOR gate is employed to reset the set-reset flip-flop 404 which is connected at its output to a first input to AND gate 414 and to one input to detector circuit 416 (FIG. 4). The clock pulses M are applied to the second input to AND gate 414. The reset pulses N are applied to the S terminals of the D-type flip-flops and to the sample-and-hold circuit 412.

In the discussion of the operation of FIG. 4 which follows, it will be assumed that during each of three successive search modes multiple targets are detected. The target information is sensed by the receiver at one bandwidth and supplied through AND gate 136 to register 130. In a second search mode immediately following the first, the target information is sensed by the receiver when tuned to a second larger bandwidth and supplied through AND gate 138 to shift register 132 while register 130 continues to store the information it received during the first search mode. Similarly, during the third search mode, the target information sensed by the receiver at a third bandwidth is clocked into register 134 while registers 130 and 132 continue to store the information with which they were loaded. At the end of the third search mode all three shift registers are read out, in parallel, at high speed by the 1 MHz clock pulses M and processed by the FIG. 8 circuits 121a, 121b, 121c, as will be described. Note that the clocking AND gates 136b, 138b and 140b are turned on only when the corresponding signal loading AND gates 136, 138 and 140, respectively, are turned on so that, for example, when signals are clocked into 132, 130 is not clocked and the information previously stored in 132 remains stored therein, and similarly when signals are clocked into 134, 130 and 132 are not clocked and the information stored in 130 and 132 remains stored.

In the operation of the system of FIGS. 4 and 8 during the period of the RAM 154 is being loaded (as discussed later), the programmer 151 supplies a reset pulse N. This sets both the D-type flip-flops of FIG. 8 so that NOR gate 403 is disabled and resets the sample-and-hold circuit 412 so that AND gate 410 is disabled. Reset-set flip-flop 404 is in a reset condition from the previous data acquisition period so that $X_1$ is a 0 and AND gate 414 is disabled. The other X's also are zero.

Assume now that the high speed unloading of the three shift registers in parallel starts. As the operation is similar for all three registers, only one of them, namely 130, and the processing circuits associated therewith are discussed. At some point during the M clock pulses, assuming that there is a target present, 1's will start to be produced at the output of the shift register 130. (If after 256 M clock pulses no target is sensed, the system will reset and await the next RAM update period which will follow a number of search mode periods.) The first of the 1 signals from shift register 130 applied to sample-and-hold circuit 412 sets this circuit and it produces a 1 output which primes AND gates 410 and sets RS flip-flop 404 thereby priming AND gate 414. Thereafter, the signal pulses produced by the AND gate 410 supplied to the hits counter 142a are clocked into the hits counter by the 1 MHz clock pulses M which pass through AND gate 414.

After the target pulses terminate, 0's start emerging from shift register 130 and AND gate 410 produces a 0 output. The first 0 applied to D-type flip-flop 401 is clocked into this flip-flop by a clock pulse produced by AND gate B. This causes the D-type flip-flop 401 to produce a 0 output which is applied to the D input of flip-flop 402. The second 0 produced by AND gate 410 has no effect on flip-flop 410 which is already producing a 0 output. However, in response to the second clock pulse produced by AND gate 414, the 0 present at the D input to flip-flop 402 is clocked into this flip-flop and it produces a 0 output. NAND gate 403 is now enabled and applies a reset pulse to RS flip-flop 404 changing $X_1$ to 0 and disabling AND gate 414.

Returning for a moment to the initial portion of the explanation of the operation of FIG. 8, in response to the first 1 produced by shift register 130, RS flip-flop 404 is set. The $X_1 = 1$ output of this flip-flop is applied to detector 416. The detector is one of the type that senses a 1-to-0 transition (not a 0-to-1 transition) so that it ignores the $X_1 = 1$ output. However, when NOR gate 403 becomes enabled and resets RS flip-flop 404, $X_1$ changes from 1-to-0 and detector 416 senses this information.

To continue the description, FIG. 4 should be referred to next. The same thing as described above occurs concurrently for shift register 132 and its associated circuits and for shift register 134 and its associated circuits. In due course $X_1$ will change from 1 to 0, $X_2$ will change from 1 to 0, and $X_3$ will change from 1 to 0 at respective times dependent on the points at which the lagging edge of the stored targets occur. At that time detector 416 which is then sensing all zeroes, produces an output to signal the computer programmer 151 to initiate the next operating phase, as will be discussed.

The hits counter 142 is a multiple output counter for producing a count in parallel on its various output leads. By way of example, if it is desired that the counter be capable of counting to 256, there will be eight such output leads. For the sake of drawing simplicity, not all of the leads are shown in FIG. 8 and such leads are illustrated by a single line in FIG. 4. The eight bits produced by the hits counter are supplied to gate 129a (FIG. 4) which normally is disabled by the A=0 output of a magnitude comparator 148. These eight bits also are applied to the comparator 148.

Figure 6:
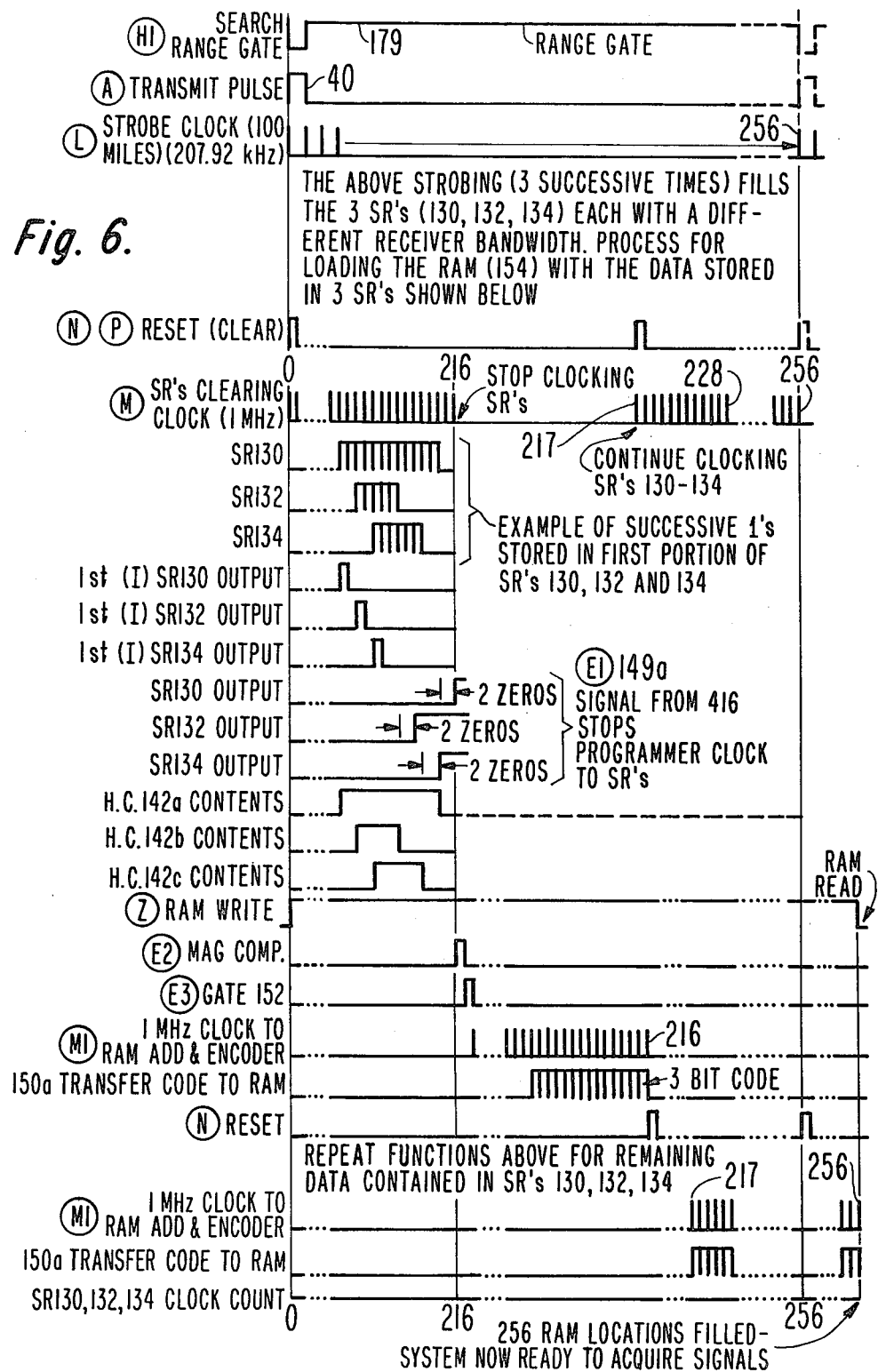
FIG. 6 is a diagram of waveforms illustrating, in more detail, the search and acquisition steps of the adaptive mode shown partly in FIG. 5.

The programmer 151 keeps track of the number of clock pulses sent since time zero and terminates the shift register readout clock pules M (when detector 416 produces an output) as shown in FIG. 6. When the shift register readouts stop, the hits counters also stop. At this time each hits counter is supplying is count to the magnitude comparator 148. The magnitude comparator then is actuated by the output E2 of the programmer to cause it to produce an output indicative of the count of highest value. In other words, the comparator compares the three counts stored in the respective three hits counters and produces an output representing the largest count. This output, which may be any one or more of A, B and C, enables the gate 129a and/or the gate corresponding thereto for the block 121b and/or 121c. The enabled gate or gates supply the count or counts (any one or more of $y_1$, $y_2$ and $y_3$) to the Y OR gate. As in the previous case, each gate such as 129a will have an output consisting of multiple conductors such as eight in the case of an 8-output counter and these are illustrated by single wires. The OR gate Y connects to AND gate 152 and when that AND gate is enabled, the binary word supplied to AND gate 152 passes to the RAM encoder 150 which will be discussed later and to the RAM address selector 156.

Returning a moment to the start of the shifting of data out of the shift registers, the first "hit" ("1") from each of the three paths from shift registers 130, 132, 134 to hits counters 142a, 142b, 142c, respectively, is an indication employed to determine the location at which a target starts. By counting the number of readout clock pulses between one of these signals and the E1 signal produced by detector 416, the computer can determine where data is to be stored in the RAM 154 as will be discussed. The OR gate Z (FIG. 8) connected to the three sample-and-hold circuits supplies a signal to the computer via path 149c to signal the computer that corresponding targets in the three registers have been read out and that the counters 142 are storing the count for these targets. The computer supplies a write signal via line 151z (which can be termed a read/write control line), at an appropriate time, to the RAM 154 and the address selector 156 as will be explained.

The count supplied by gate 152 is processed to determine the value of each 3-bit word to be stored in RAM 154, as will be explained. In brief, when the encoder 150 determines that the output of comparator 148 is a very large target, a 7 (111) may be stored in RAM 154 at the locations corresponding to the position of that target. For a somewhat smaller target, a 6 (110) may be stored in RAM 154 at locations corresponding to the position of this smaller target, and so on, a zero (000) being stored at locations in 154 corresponding to the positions (ranges) at which there are no or very small targets.

AND gate 152 when enabled by computer 151 (waveform E3), provides the weighted hits counts to encoder 150 and the latter supplies its output to RAM 154, which is addressed by selector 156. The encoded signal from encoder 150 represents the duration and thus the bandwidth of the respective longest echoes received by the registers (130, 132, 134). The RAM 154 provides an input to D/A converter 158 via 3-lead bus 154a. Any one of eight discrete values of each encoded echo signal duration is represented by the 3-bit coded signal. The output of D/A converter 158 is coupled through AND gate 166 which is enabled by the data acquisition range gate signal 180 (waveform H2, FIG. 7), to bandwidth control 162.

RAM 154 has a capacity of 256 3-bit words. Each location in RAM 154 corresponds to a location in the three shift registers 130, 132 and 134. Thus, for example, location 50 in RAM 154 corresponds to the 50th location in the three registers. This location corresponds to a particular radar range when the register is loaded. In the case, for example, in which the total range of interest is 100 miles, location 50 would represent a range bin at roughly 20 miles when the register is fully loaded. As will be discussed in more detail later, the value of the 3-bit word stored at a particular location in RAM 154 represents the bandwidth to which the receiver is to be tuned during a time corresponding to that radar range. Thus a stored word 000 may indicate a broad band, a stored word 001 a narrower band, and so on. In the present system, the convention adopted is that when no echo is received at a particular range, a zero is stored in the range bin in the shift registers 130, 132, 134 for that range, and three zeroes are stored in the corresponding location in RAM 154.

Assume that the system is operating for a selected maximum range of 100 miles. A range of 100 miles is equivalent to an elapsed time from transmit signal (A) to the return echo (F) (FIG. 5) of 1,235 $\mu$s. Using a shift register (130) of 256 bins, each bin must be open for a period of 4.824 $\mu$s requiring thus a clock rate of 207.29 kHz to provide the proper range strobe time. If the shift registers (130-134) are cleared at a significantly higher rate than the strobe rate, preferably 1 MHz, the 256 bins of the shift registers can be cleared in 256 $\mu$s. This would then permit a pulse repetition frequency (PRF) of the transmitter 30 up to 3,906 Hz and still allow for an evaluation of the search data between two transmit pulses 40 before a following transmit pulse 40 is made. In this embodiment, this evaluation is done between the third and fourth transmit pulses 40. For each different range selected for operation, a different clock rate is required, as mentioned above, for strobing the shift registers (130-134) and clearing RAM 154. Thus, for a maximum range of 200 miles the strobing clock is at half the frequency of the 100 mile maximum range clock, namely 103.64 kHz, since it takes a longer time to fill all the bins of the 256-bit shift registers. Furthermore, for a maximum of 50 miles, the frequency will be double that of the clock for the 100 mile range, namely 414.58 kHz, since the shift registers have to be loaded at a faster rate than for the longer ranges.

Referring back to FIG. 4, the RAM write signal (on line 151z) is applied to RAM address selector 156 to cause selector 156 to stop, at the range of the first hit, from further addressing of the range bins of RAM 154.

This operation conditions the circuit for the subsequent loading of encoded words into the RAM 154 starting at that range bin location. When detector 416 produces an output, it is indicative of the last bit of the longest echo and for purpose of addressing RAM 154, the address is defined by these first and last bits. The approximation made in the present embodiment is to provide a bandwidth control signal at ranges possibly closer and further than the actual range of the target. This approximation does not adversely affect the bandwidth "matching" performance of the system.

Encoder 150 functions to encode the longest hits count signal from comparator 148 into a 3-bit word for loading into RAM 154. Encoder 154 responding to clear signal (waveform P, FIG. 6) on path 151e from computer 151, encodes the maximum duration count from comparator 148 into a word in the form of a 3-bit signal. The 3-bit signal represents any one of eight different durations of echoes. Accordingly, an echo represented by the longest hit count from comparator 148 is encoded to a word serving to represent any one of eight bandwidths to which the receiver 20 is to be adjusted. When the receiver bandwidth B is adjusted to one of such eight values, the receiver is substantially matched if not identically matched (in the sense that $BT=\alpha$, where T is the echo signal duration and $\alpha$ is a constant equal to say 1.2) to the frequency spectrum of the expected echo signals (waveform D, FIG. 5). In order to do this, encoder 150 is provided with suitable logic or a look-up table representing the bandwidth and corresponding duration for each of eight different reference echoes satisfying the optimum bandwidth relationship $BT=1.2$, equation discussed above. In response to the longest hit signal from comparator 148, encoder 150 generates a 3-bit word representing the optimum bandwidth most nearly corresponding to one of the eight reference echoes. The eight bandwidths are selected to be within the adjustable bandwidth spectrum of the receiver 20 in any desired spacing between the frequency steps. Each 3-bit word is converted to a voltage 206 (FIG. 7) to adjust the bandwidth of the receiver 20 at a range corresponding to the range bin of RAM 154 in which the word is stored as will be further explained.

During the loading phase for RAM 154, provision must be made to clock in the information for each of the address locations. The data words, 256 of them corresponding to the 256 locations in a shift register such as 130, will therefore need 256 clock pulses to complete the loading. This clocking is provided to the RAM 154 from the address selector 156 via lead 156a. This clocking is done in spurts, depending upon the length of the word being clocked into the RAM and the successive locations in which it will be placed in the RAM. During the write phase, the read/write control line 151z is placed at the write level by the computer programmer 151. Usually the same leads are used for data in or data out of a RAM such as 154; however, they are shown separately in FIG. 4 (150a and 154a, respectively) to simplify the explanation. During the read period, the read/write control lead 151z is placed at the read level and then as the clock is passed to the RAM from the address selector 156 via lead 156a, the RAM is read out in sequence into the D/A 158 for further control of the IF amplifier bandwidth. No clock is needed in the RAM since this RAM application is a serial one and all the address does in the read phase is to sequence the data out of the RAM since it was stored in the correct range locations during loading (write). The RAM can be read out as many times as desired as long as the read/write control lead is in the read logic condition.

The clocks supplied to RAM 154 via bus 156a serve to load each three-bit word from encoder 150 into RAM 154 at the respective storage locations corresponding to the entire range of the echo signal. Each 3-bit encoded word signal from encoder 150 is applied via the three input leads 150a and stored in each RAM bin corresponding to all the ranges including the nearest and farthest range of the target corresponding to that word. While selector 156 is clocked as the shift registers 130-134 are being cleared, the selector 156 advances the address of RAM 154 on a bin-by-bin basis for each clock pulse. RAM 154 will be set to receive a word describing a target size from encoder 150 at the range bin where the first hit from that target was received and will store the same word at following locations to represent the maximum possible echo duration. The detector 416 has indicated to the computer 151 the end of the target and the computer changes the word being stored in the RAM from the encoder 150, as required, to describe the contents of the shift registers. For example, if the first hit occurred at the 100th bin of RAM 154, bins 1-99 will each have been stored with a 3-bit "000" word representing the first of eight possible bandwidth control voltages 206, namely, the voltage level for adjusting the receiver to the maximum bandwidth. The 3-bit word 111 represents the eighth word of the possible eight used to generate the voltage 206 for adjusting the bandwidth to a minimum value. Thus, the same 3-bit word from encoder 150 will be stored in each RAM bin of that target and eventually used to generate bandwidth control voltage 206 (FIG. 7) as will be explained further. Continuing this example, if the last hit occurred from the 109th bin of any one of the shift registers, RAM 154 will be addressed by selector 156 for ten bins (bins 100 to 109 inclusive) to store the 3-bit word from encoder 150 representing the longest hits count determined by comparator 148. This longest word, it should be appreciated, may have been only the equivalent of seven bins long, for the reasons explained above. Assuming the 7-bin count is encoded as a 3-bit word of "100," the bits "100" will be stored in RAM 154 bins 100-109.

Digital-to-analog (D/A) converter 158 is a conventional converter that converts the three-bit digital word from RAM 154 on a bin-by-bin basis into a discrete voltage value (waveform W, FIG. 7) for controlling the bandwidth of IF amplifier 20 via lead 62 (FIG. 2). D/A 158 is strobed by the strobing clock 308 (waveform L) during the data acquisition mode (the transmission probing pulses numbered 4-8, as will be explained further) to control the bandwidth control generator 162 via enabled AND gate 166.

IF bandwidth control voltage generator 162 is a suitable voltage generator providing DC voltages of eight discrete values in accordance with the voltages from converter 158. Each of the eight discrete voltages represents a bandwidth to which amplifier 20 is to be tuned. Assuming that the Q of the tuned circuits of each stage of amplifier 20 is varied by the PIN diodes within the range of 32.4 kHz to 350 kHz, each of the eight voltage steps will correspond to the tuned frequency desired. In practice, the spectrum of the bandwidth will be, in eight steps, satisfactorily matched to the spectrum of virtually all of the possible echo pulses that may be received during the operation of a weather radar.

Furthermore, bandwidth voltage generator 162 is arranged to respond to a control signal 200 (waveform T, FIG. 7) on path 151c during the period when no signals are provided to it via AND gate 166. According to this aspect of the system, the period during which no signals are received via AND gate 166 occurs while the three search modes are operating, namely following the first, second and third transmitting pulses 40. During these periods the IF amplifier 20 is tuned to a nominal predetermined frequency of the search for each of the respective shift registers 130–134. Thus, assuming three searching bandwidths of 32.4, 100 and 350 kHz, shift registers 130, 132 and 134 will function to receive, in sequence, echo signals responsive to the respective transmit signals of the respective IF bandwidths 32.4, 100 and 350 kHz. Computer 151 provides this control and accordingly provides control voltage 200 (waveform T, FIG. 7) having amplitudes 201, 202 and 203 corresponding to the three bandwidths to which the IF amplifier 20 is to be tuned during the respective searching periods. Waveform 200 can be delayed, if desired, for tuning the IF amplifier to a wide bandwidth for relatively short distances such as in the range of zero to 10 miles since narrower bandwidths of the IF amplifier have no effect on echo signals of such short range, as explained hereinabove.

Figure 5:
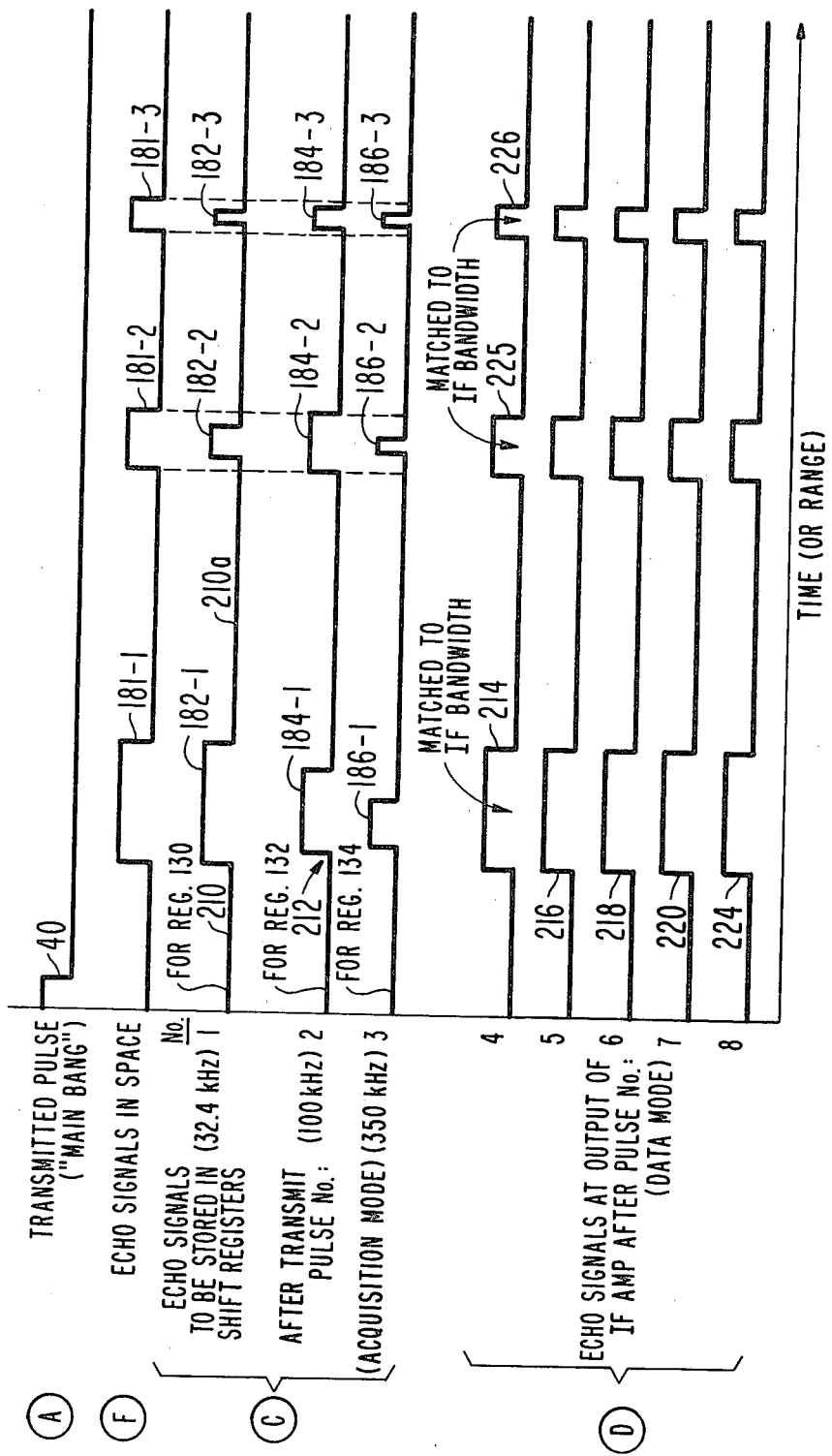
FIG. 5 is a timing diagram with waveforms useful in understanding the adaptive mode aspect of this invention.

Referring first to FIG. 5, transmit strobe pulse 40 (waveform A), the first of eight pulses for each acquisition (search) and data sequence, is generated by transmitter 30 responsive to modulator 28 under control of signal 41 from computer 151 via lead 29. In a typical system with a 3° beam width, a suitable scanning rate and pulse repetition rate of the transmit signals 40, for three search probe pulses and five data gathering probe pulses can be provided within a 3 dB beam width. In the operation of the embodiment now being described, it will be assumed that the selected range of operation of the radar is within 100 nautical miles. At this range the strobing clock of 207.92 kHz (waveform L, FIG. 6, signal 208) is used. It is assumed further that only one azimuth position of the antenna is being considered for that selected range of operation. The operation of the system for other ranges and antenna positions will be understood to be performed in a similar manner and, accordingly, will not be described. However, it should be understood, that, in practice, the data collected from a complete scan of all the desired antenna positions in azimuth for each selected range is displayed on the indicator for evaluation. If other ranges of search are required, the operator changes the range of operation in a conventional way as mentioned hereinabove. A complete scan for all the desired antenna positions for each of such other ranges will then be performed.

In response to the first strobe pulse 40, of a sequence of eight strobe pulses, the actual in-space echo signals 181-1, 181-2 and 181-3 may be developed, as an example, for reflections from various and different sized storm cells as shown by waveforms F (FIG. 5). Each of the respective three signals (F) is of different duration indicating a storm cell of different depth, each at a different range. The longer echo 181-1 represents the deeper (longer) storm cell while echo 181-3 represents the shortest storm cell. Waveform signals F are received by antenna 10 and then passed through amplifier 20, detected and passed into the shift registers. Shift register 130 is designated as the register for storing the C1 signals received with the amplifier adjusted to have a bandwidth of 32.4 kHz during the period following the first pulse 40. The length of the C1 signal waveform 182-1 generated from F waveform 181-1 will determine how many bins of shift register 130 are stored with signals represented by the bit 1 and the range of the target producing the C1 signal will determine the locations in the register of these bins. The portion 210 of the waveform C1 represents an absence of an echo whereby signals of binary 0's are stored in the shift register 130 for this portion. During the period of time (portion 210a) of the waveform following signal 182-1, another signal series of 0's will be stored in shift register 130 followed by a series of 1's corresponding to the pulse portion 182-2. Echo 182-3 corresponding to F signal 181-3 for this probe is also received and detected. Note that C1 signal 182-2 is shorter than F signal 181-2. C1 signal 182-2 is shorter than 181-2 to illustrate that the receiver 20, having a bandwidth of 32.4 kHz, functions thereby as a filter to pass less of the frequency spectrum of signal 181-2 resulting in a detected signal of less duration than the actual signal 181-2. Moreover, the C waveforms are all shorter in duration than the corresponding F waveforms from which they are derived. However, their respective durations for the different receiver (20) bandwidths through which they are passed are not necessarily consistent with the expected change in duration effected by the filter effect of the receiver according to theory. This is shown to illustrate that if the receiver bandwidth is not matched to the echo frequency spectrum, anomalous echoes not easily explained by theory may be displayed. Nevertheless the processing of the sampled echo signals by the signal processor of this invention will match the echo signals as shown by the D echo signals (FIG. 5) to be described.

In response to the second transmit pulse 40, with the bandwidth of IF amplifier adjusted to 100 kHz, waveforms 184-1, 184-2 and 184-3 will be stored as a sequence of one bits in shift register 132 in the range locations corresponding to the C-2 waveform 212. It is noted, again, that signal 184-1 is of shorter duration than waveform 182-1 both of which are presumed to have been responsive to the duration of the actual first and second group of F echo signal 181-1 in space returned, respectively, in response to the first and second pulses 40. This difference is caused, in theory, by the increased IF amplifier receiver bandwidth for this probe, namely an increase in bandwidth from 32.4 to 100 kHz, which change reduces the pulse length and to some extent the amplitude passed through the IF amplifier 20. Similarly, the signal waveforms 184-2 and 184-3 appear in the shift register 132 as binary 1's in locations corresponding to the range at which each portion of the echo signal was received. Moreover, the third strobe pulse 40 generates echo signals C3 which, when passed by receiver 20 with the bandwidth adjusted to 350 kHz into the shift register, are stored as bits according to the length of waveforms 186-1, 186-2 and 186-3, respectively.

At the end of the third strobe pulse 40 and before the transmission of the fourth pulse, the system of FIG. 4 functions to evaluate the three sets of waveforms C stored in shift registers 130–134 to determine thereby the required bandwidth to which the amplifier should be adjusted for the expected subsequent echoes D generated by probes numbered 4 through 8. The echo signals (assumed to be similar to F echoes 181-1, 181-2 and 181-3) when received will be passed directly to the video processor 24 for conversion to digital form for display via path 25.

In the operation during which echo signals D4–D8 are expected to be generated, the bandwidth of amplifier 20 is adjusted to the bandwidth for each range bin corresponding to the bandwidth and range of the longest echo signal determined by the comparison of the echo signals (C1–C3) that were received during the search mode following the first, second and third transmission pulses 40. Accordingly, waveforms D are shown to have a duration at each of the ranges and at each of the probe periods that are identical for each expected reply (signals F) at its respective ranges. Thus, waveforms 214, 216, 218, 220 and 224 are of the same duration indicating that amplifier 20 had been automatically adjusted to a bandwidth corresponding to the frequency spectrum of the respective echo signals 214–224 manifested by their respective durations. Accordingly, for this range, that is, the range portions at which F signal 181-1 occurs, the bandwidth of amplifier 20 is adjusted to match the echo signals automatically by the bandwidth control voltage 206 (FIG. 7) developed by voltage generator 162 (FIG. 4).

Figure 7:
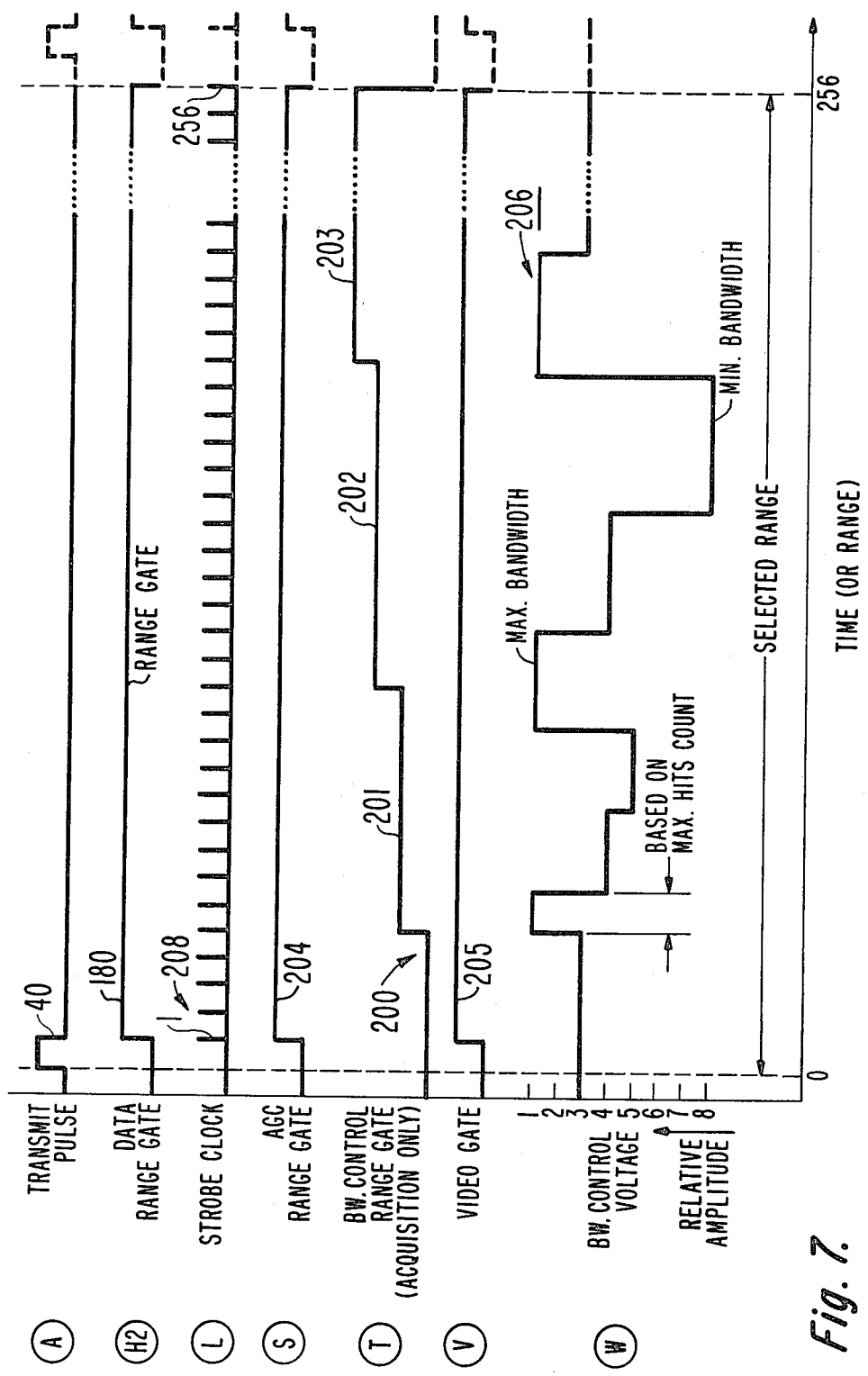
FIG. 7 is another diagram of waveforms illustrating, in more detail, the data collecting steps of the adaptive mode shown partly in FIG. 5.

Waveform W shown in FIG. 7 illustrates the various forms that bandwidth control signal 206 may take. The voltage amplitudes values varying between relative values of 1–8 cause the PIN diodes D1–D4 of FIG. 2 to be biased, respectively, at values that thereby change the bandwidth of each tuned circuit and thus the IF receiver bandwidth. The duration of each step of signal 206 determines the time (or range interval) during which the PIN diodes are biased at that amplitude. This time period (or range), as explained above, is determined by the duration of echo signal as determined by the maximum hits counts. Thus the W waveform is a manifestation of the data stored in RAM 154.

The following echo signals 225 and 226 developed by the fourth probe are similarly matched to the receiver in the subsequent probe numbers 5–8 as seen in FIG. 5, as waveforms D5–D8.

The manner in which the search and acquisition functions are performed will now be described with reference in FIGS. 4 and 6 and 7. First, range gate 160 responsive to a signal from computer 151 in synchronism with probe signal 40 starts the range gate 179 (waveform H1, FIG. 6) which primes all the AND gates 136–140, only gate 136 being enabled by a binary 1 signal on lead 136a of bus 137 supplied by computer 151. Computer 151 maintains gates 138 and 140 disabled by supplying binary 0's on leads 138a and 140a. During the time following the first transmit pulse 40, echo signals (waveform F, FIG. 5) that may be received will be passed into the shift register 130 as echo signals C1 and strobed into the shift register bin positions corresponding to the respective 256-clocks by the L clock signal 208 (FIG. 6). Accordingly, all echoes providing a positive response above the predetermined threshold of detector 141 will be stored in the shift register 130 as a series of adjacent binary 1's at range locations determined by the strobed bin positions. This process is repeated for storing echoes (F) in the shift registers 132 and 134 following the second and third transmission pulses 40 during which time the receiver 20 is tuned to bandwidths of 100 and 350 kHz, respectively.

At the end of the strobing of the third shift register 134, computer 151 changes the clock from the strobe frequency of 207.92, clock (L) to a one MHz clock (M). Computer 151 also enables all of the shift registers for a clearance operation to clear the respective outputs of shift registers simultaneously at a one MHz rate as already described. The action of the elements of circuits 121 and 148 also already has been described. The selection of RAM address by 156 and the loading of the RAM 154 already have been discussed.

Following the RAM loading step, computer 151 stops clock M1 and restarts the shift register clearing operation with restart waveform signal N (FIG. 6); clock M is restarted and applied to the shift registers to continue reading them out, in parallel, and to repeat the process already discussed for any further stored targets. For each target processed, the comparator 148 opens one or more of the gates 129a, b and c, as appropriate, depending on the counts stored in 142a, b and c. In the example of FIG. 5, gate 129a is opened as signal 181-1 is the longest. However, if all three hits counters contained the same count, all three gates would be opened.

Turning to FIG. 6, at RAM location 216 for the three shift registers, note that the last two zeroes have occurred at gate position 216. In this position signal E1 on lead 149a causes the computer 151 to stop the 1 MHz clocks M. The signal E2 (FIG. 6) actuates the comparator 148 and by the next computer programmer pulse E3, opens gate 152 thus transferring the longest word into encoder 150. The next event is the signal M1 and Z which starts to clock into RAM 154, first no data and then, at successive RAM locations, the word stored in encoder 150 until the end of the word (end of 181-1, FIG. 5 in this example). Thereafter the computer 151 returns to the three shift registers and continues to unload them, in parallel, starting at the point (end of 181-1) where it left off. The process is shown briefly at the bottom portion of FIG. 6 for two more targets. Note that at the start of each new group of readout pulses M (as at 217), a new reset pulse N occurs for application to the hits counters and FIG. 8 circuits.

Sooner or later the computer will record a count of 256 which indicates that all three shift registers have been read out. At this time the computer knows that it has reached the end of the RAM 154 loading the resets the system to start the five successive data modes shown in FIG. 5.

After the three search scans, the fourth transmission pulse 40 is transmitted to collect data for display. Computer 151 enables AND gate 167 by signal 205, (waveform V, FIG. 7) to thereby pass all signals from IF amplifier 20 via path 167a directly to the video processor 24 via path 60 (FIG. 1C). AND gates 136–140 are disabled by computer 151 via bus 137 during the 4th to 8th probes, whereby no echo signals are passed into shift registers 130–134.

RAM 154 and D/A converter 158 are clocked at a 207.29 rate (waveform L) via bus 151a in synchronism with probe 40. Accordingly, each bin location of RAM 154 is cleared into converter 158 at a rate corresponding to the range of expected echoes responding to the respective 4th to 8th probe signals 40. As the L clock clears the 256 bins of RAM 154, D/A converter 158 develops voltage 206 (waveform W, FIG. 7) for energizing bandwidth voltage generator 162 through AND gate 166 enabled by data range gate signal 180 (waveform H2 of FIG. 7). During this period starting with the fourth transmitted pulse 40 (waveform A), the IF bandwidth control generator 162 is no longer under control of waveform T on bus 151c. Voltage generator 162 provides voltage 206 (waveform W) at a magnitude that maintains or changes the effective resistance of PIN diodes D1–D4 to change thereby the bandwidth of each stage and thus the receiver bandwidth as described above. The bandwidth of IF amplifier 20 is automatically changed by generator 162 via lead 88 to match the echo signals on a range-bin basis that are generated in response to the 4th to 8th probes (40), respectively.

Simultaneously, AGC generator 164 provides gain control signal 46 (waveform K, FIG. 3) to IF amplifier 20 via lead 90 to modify the gain of the receiver accordingly, as explained hereinabove.

Echo signals F (FIG. 5) are passed directly through IF amplifier 20 which is adjusted to a bandwidth that "matches" the expected echoes D (214-255-226). The received analog video echoes are then passed through processor 24 (FIG. 1C) for conversion to digital signals for viewing at the display.

During the readout of a register such as 130, the end of a target is sensed by recognizing two successive zeroes. If there is only a single zero within a target (surrounded by 1's) the system recognizes it is noise. Referring to FIG. 8, the single zero causes the state of D-type flip-flop 401 to change (its Q output changes from 1 to 0) but the immediately following 1 from 130 causes 401 to return to its initial state (its Q output changes back to 1). The timing is such that NAND gate 403 remains disabled and flip-flop 404 remains set.

Figure 9:
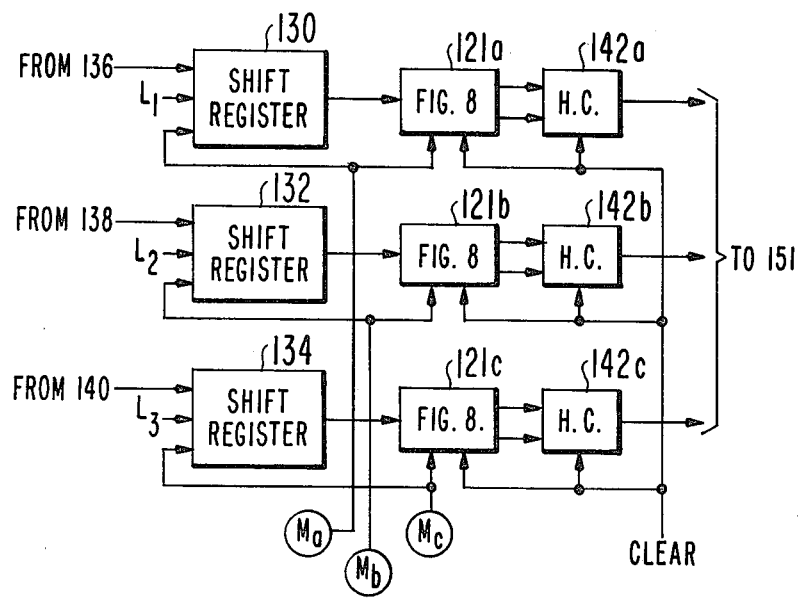
FIG. 9 shows a portion of a modification of the system of FIG. 4.

FIG. 9 differs in detail from the system of FIG. 4 but the operating principle is the same. In such a system the shift registers are clocked separately and each is read out in its entirety before the following one is clocked. For example, during the first search mode, after 256 read-in clocks $L_1$, there may be a 10-bin target at a first range, a 40-bin target at a second range, and a 20-bin target at a third range in shift register 130. In this event, during a first burst of readout clock pulses $M_a$ applied to 130, the hits counter 142a will store a count of 10. When this occurs, this count is transferred to the computer 151 for storage there and the hits counter cleared. As in the case of the FIG. 4 embodiment, the computer 151 notes the location at which the target starts and the location at which it ends in the same manner as discussed above.

After the first stored target is read out, the shift register 130 is clocked again by a second burst of pulses $M_1$ until the next stored target information is read out which will result in a count of 40 stored in the hits counter 142a. Again this information is cleared from the hits counter and stored in the programmer 151 for future use and the computer programmer 151 also stores the location at which the target starts and at which it ends. This process is repeated one more time to obtain information as to the 20-bin target at the third range and this is stored in the computer.

After the completion of the first search mode (256 $L_1$ pulses and 256 $M_a$ pulses), the second search mode can begin. First, shift register 132 is loaded in response to the clock pulses and then is read out in bursts by the readout pulses $M_b$ applied to shift register 121b. Each time target information is read out of the shift register 132, the hits counter records this information, it is transferred to the computer and the hits counter is cleared in the same manner as has been discussed. Upon the completion of the second search mode, the third search mode takes place in response to the read-in pulses $L_3$ and the readout pulses $M_c$. Upon the completion of all three search modes, the computer programmer 151 will store all of the target information and perform the comparisons already discussed in detail below and which are shown for purposes of that simple example as being performed in comparator 148. The programmer 151 also controls the loading from encoder 150 to RAM 154 and its unloading to D/A 158 in a manner similar to that discussed above.

What is claimed is:

1. In a return echo ranging system, comprising:
   means for transmitting a ranging signal;
   a receiver for receiving one or more echo signals from said ranging signal;
   means for sampling said echo signals according to a respective one of a plurality of predetermined receiver bandwidths, each one of said plurality of receiver bandwidths corresponding to a respective bandwidth portion of the frequency spectrum of an expected echo signal from subsequent ranging signals, to generate a sample signal indicative of the frequency spectrum bandwidth portion of such an expected echo signal; and
   means responsive to said sample signal for varying the bandwidth of said receiver to substantially match the bandwidth of the frequency spectrum of said expected echo signal.

2. The apparatus according to claim 1 wherein said receiver comprises at least one resonant circuit which determines said bandwidth of said receiver, said resonant circuit including a variable resistor, and said bandwidth varying means comprises means for varying said variable resistor whereby said resonant circuit Q and said receiver bandwidth are varied.

3. In a system as defined in claim 2 wherein said resonant circuit comprises an inductor, a capacitor and a variable resistance PIN diode connected to form a parallel resonant circuit with said inductor and capacitor, and wherein said bandwidth varying means comprises a voltage generator for generating a voltage that varies according to the range of said expected echo signals and means for applying said voltage to said PIN diode to bias said diode to vary the effective resistance thereof whereby the Q of the circuit is increased and the bandwidth of said circuit is reduced as the range of said expected echo signals increases.

4. In a system as defined in claim 1 further including means for varying the gain of said receiver as a function of time.

5. In a system as defined in claim 1 wherein said sampling means includes sequential storage means for storing signals having one of each of said plurality of predetermined bandwidths and further includes means for coupling received echo signals according to each respective bandwidth to one of said sequential storage means in sequence so that each of said sequential storage means stores signals indicative of a respective set of echo signals received in response to each ranging signal, each set of echo signals corresponding to a respective one of said predetermined bandwidths.

6. In a system as defined in claim 5 further including an addressable storage means for storing signals received from said sequential storage means in a storage location corresponding to the range of each corresponding echo.

7. In a radar system including a transmitter for transmitting pulses to targets during successive range scan periods and a receiver for receiving echoes from such targets, in combination:
   means for changing the bandwidth of the receiver to N different values during N different range scan periods, where N is an integer between 2 and 5;
   means for ascertaining the duration of the received echo from the same particular target during each said range scan interval; and means for determining which of said N echoes received from said particular target, is of the longest duration.

8. In a radar system as set forth in claim 7, further including:
means for sensing the time at which the first occurring of said N echoes received from said particular target starts.

9. In a radar system having an intermediate frequency amplifier in a radar receiver, said receiver having a gain and said system having means for adjusting the bandwidth of said amplifier, wherein the improvement comprises:
means for automatically varying said amplifier bandwidth such that said bandwidth of said amplifier is approximately equal to a bandwidth of a frequency spectrum of an expected radar return pulse from at least one particular target range, said bandwidth varying means being responsive to a returned radar pulse for varying said amplifier bandwidth of said receiver as a function of a duration of a returned radar pulse; and
means for automatically varying said gain of said radar receiver as a function of time.

10. In a radar system including a radar receiver having a gain and an intermediate frequency amplifier therein, said radar system having means for adjusting the bandwidth of said amplifier, wherein the improvement comprises:
means for automatically varying said amplifier bandwidth such that said bandwidth of said amplifier is approximately equal to a bandwidth of a frequency spectrum of an expected radar return pulse from at least one particular target range;
means for automatically varying said gain of said radar receiver as a function of time; and
an antenna having a beamwidth, said beamwidth of said antenna having a beam filling capacity of a standard weather storm cell for a predetermined range, wherein said receiver has an effective gain that is controlled by a summation of gains produced by said means for automatically varying gain, and of an effective gain produced by said bandwidth varying means to a value of 6 dB per octave of range for ranges up to said predetermined beam filling range and to a value of 12 dB per octave of range for ranges extending beyond said predetermined beam filling range.

* * * * *